US010187258B2

(12) United States Patent
Nagesh et al.

(10) Patent No.: US 10,187,258 B2
(45) Date of Patent: Jan. 22, 2019

(54) CREATING AND MANAGING DYNAMIC INTERNET OF THINGS ENTITIES

(71) Applicant: Cognito Networks, Inc., Saratoga, CA (US)

(72) Inventors: Kittur V. Nagesh, Saratoga, CA (US); Guruprasad Kini, Bangalore (IN); Jagadishchandra Sarnaik, San Jose, CA (US)

(73) Assignee: Cognito Networks, Inc., Saratoga, CA (US)

( * ) Notice: Subject to any disclaimer, the term of this patent is extended or adjusted under 35 U.S.C. 154(b) by 154 days.

(21) Appl. No.: 15/498,209

(22) Filed: Apr. 26, 2017

(65) Prior Publication Data

US 2017/0310549 A1    Oct. 26, 2017

Related U.S. Application Data

(63) Continuation of application No. 62/327,522, filed on Apr. 26, 2016.

(51) Int. Cl.
*H04W 4/70* (2018.01)
*H04L 12/24* (2006.01)
*H04L 12/26* (2006.01)
*H04L 29/08* (2006.01)

(52) U.S. Cl.
CPC ......... *H04L 41/0893* (2013.01); *H04L 43/08* (2013.01); *H04L 43/16* (2013.01); *H04L 67/12* (2013.01); *H04W 4/70* (2018.02)

(58) Field of Classification Search
CPC ..... H04L 12/24; H04L 29/08; H04L 41/0893; H04L 67/12
See application file for complete search history.

(56) References Cited

U.S. PATENT DOCUMENTS

| 2016/0006815 | A1* | 1/2016 | Dong | G06F 9/46 709/204 |
| 2017/0171090 | A1* | 6/2017 | Britt | H04L 47/2425 |
| 2017/0235783 | A1* | 8/2017 | Chen | H04W 4/70 707/691 |

\* cited by examiner

*Primary Examiner* — El Hadji M Sall
(74) *Attorney, Agent, or Firm* — Lowenstein Sandler LLP

(57) ABSTRACT

An Internet of Things (IoT) entity manager receives a first data stream from a first system and identifies an entity associated with the first data stream. The IoT entity manager receives a second data stream from a second system, wherein the second system lacks interoperability with the first system, determines that the second data stream is associated with the entity, and dynamically generates a first virtual entity to represent the entity and to reflect an IoT context captured by the first virtual entity. The IoT entity manager applies a management policy to the first data stream and the second data stream to determine a status of the first virtual entity and provides a notification of the status of the first virtual entity as defined by the policy.

20 Claims, 7 Drawing Sheets

CREATING AND MANAGING DYNAMIC INTERNET OF THINGS ENTITIES

RELATED APPLICATIONS

This application claims the benefit of U.S. Provisional Patent Application No. 62/327,522, filed on Apr. 26, 2016, the entire contents of which are hereby incorporated by reference herein.

TECHNICAL FIELD

This disclosure relates to the field of Internet of Things (IoT) systems and, in particular, to creating and managing dynamic IoT entities.

BACKGROUND

Billions of devices are being connected to the Internet to form the Internet of Things (IoT), which is far bigger than our current Internet. The IoT includes networks of sensors and things and subsumes machine-to-machine, machine-to-human, and human-to-human sensor systems as well as software things in applications and databases. Things include sensors, which are hardware items we can touch and which can measure certain data values of interest. For example, a sensor can include a temperature sensor or a humidity sensor. A thing can also be a software object in a program or a database, which serves a similar purpose of measuring items of interest, but may not have a physical manifestation. An example of a software thing can be the number of employees in a company database or a performance indicator of a virtual machine in a data center.

In the absence of dynamic and flexible IoT entities, multivendor interoperability and creation of closed-loop (autonomous) IoT systems are laborious and may require manual intervention. It is typical to see isolated sensor (IoT) networks for badge management, access management, building management, supervisory control and data acquisition (SCADA) system management, surveillance, supply chain management, and other operations or business applications. These silos often prevent intelligent policies from being applied that cross vendor boundaries. Consequently, automation of business rules and workflows suffers due to limitations of interoperability, scale, and IoT context.

BRIEF DESCRIPTION OF THE DRAWINGS

The present disclosure is illustrated by way of example, and not by way of limitation, in the figures of the accompanying drawings.

DETAILED DESCRIPTION

Figure 1:
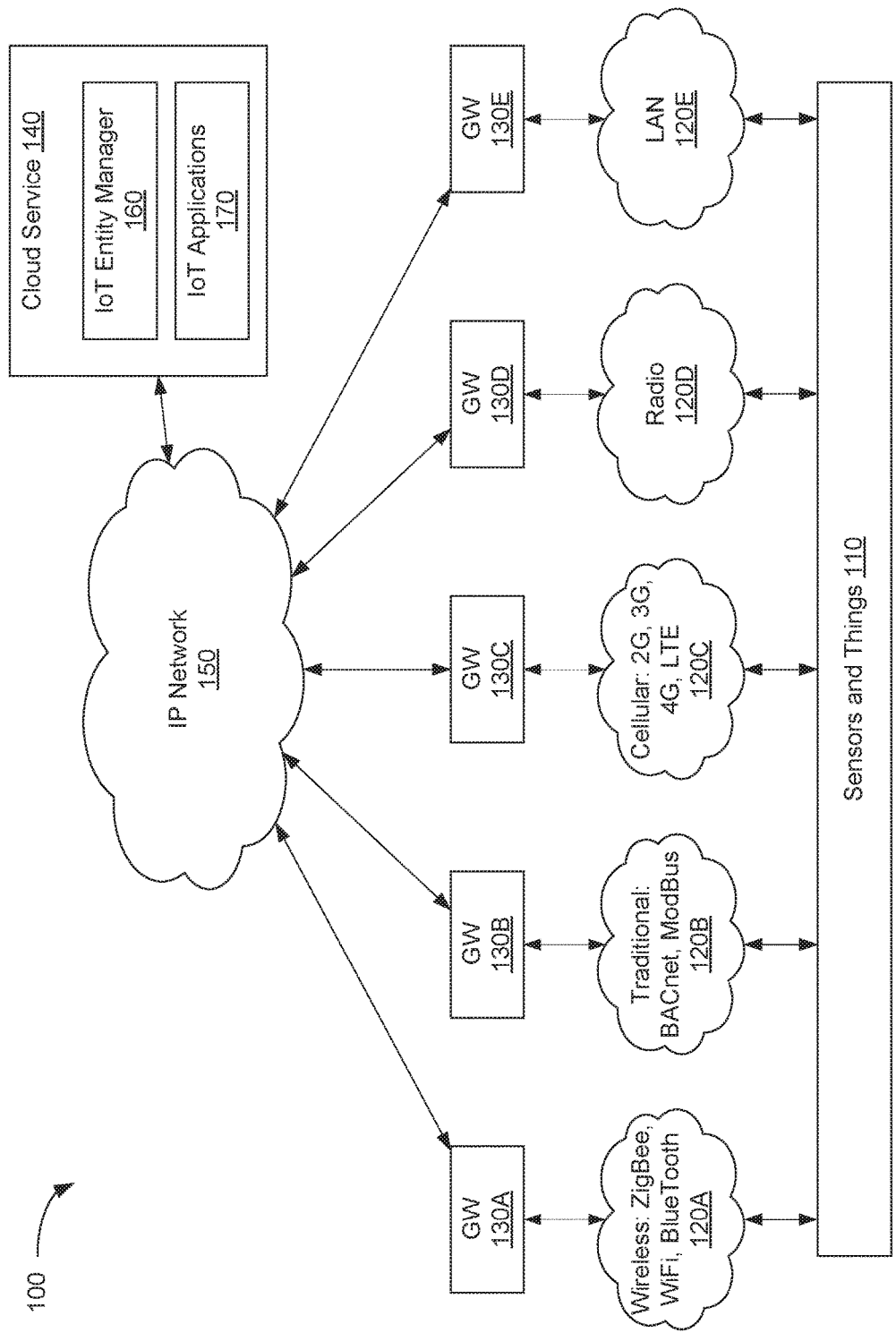
FIG. 1 is a block diagram illustrating a computing environment for creating and managing dynamic IoT entities, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for creating and managing dynamic Internet of Things (IoT) entities. In one embodiment, an IoT entity manager generates virtual entities representing combinations of sensors and things to mitigate the disadvantages of conventional IoT systems and provide an actionable framework for multivendor interoperability and policy and workflow automation for Enterprise, Small-Medium Business, Consumer, and Industrial applications. The IoT entity manager can eliminate any geographical limitations in how IoT systems are used to create virtual entities from a plurality of sensors and things by using a FlexEntity. The data items can be received from anywhere in the Enterprise or from another network or from the broader Internet, so long as there is network reachability for the source of the data item. In the FlexEntity IoT system, the networks themselves can be various types and support a variety of protocols, including but not limited to wireless (e.g., 2G, 3G, LTE, WiFi, BlueTooth, ZigBee, LoRa) or wired (e.g., Ethernet) or other protocols such as BACnet, Modbus, SNMP, RS232, RS422, RS485, etc., or IP-based networks. Thus, the use of FlexEntities unifies IoT subsystems and provides interoperability while protecting investments in SCADA systems and other sensor networks.

In one embodiment, the IoT entity manager defines one or more FlexEntities to accommodate various data items from various sensor subsystems and unifies the visualization, monitoring, policy management, and workflow automation that uses conditions from one or more FlexEntity data items based on the relative priority of the various data items. A FlexEntity may be associated with a combination of data items that can deliver decision-making benefits to the enterprise. For example, a door status data stream providing open/close information can be combined with a camera around the door to create a more relevant FlexEntity for surveillance. The IoT entity manager may dynamically add additional doors or cameras or badge readers to create an even richer virtual entity without compromising interoperability or policy behaviors.

In one embodiment, the IoT entity manager can use FlexEntities to build up a full system or enterprise solution. These instances can be applied as inputs to the IoT system or as actions based on the behaviors of the inputs to the IoT system. In some embodiments, a FlexEntity can be a hybrid of the two. Depending on the use case, a FlexEntity may optionally be referred to as FlexEntityIn, FlexEntityOut, or FlexEntityHybrid.

In another embodiment, a FlexEntity can aggregate data items from sensors and controllers that belong to different vendors to provide interoperability and enterprise automation at a business level, thus breaking vendor silos. A FlexEntity can further aggregate data items from real sensors and things along with items that can be modeled in software. In addition, a FlexEntity can model the various data items completely in software in order to validate a full IoT solution before deployment. In each of the embodiments, the actions based on the FlexEntity data items or information sources can be real, thus enabling the Enterprise to completely verify solutions regardless of the combination of real and modeled data items. Through the FlexEntity, the IoT entity manager can provide technical and business advantages including multi-vendor interoperability, the scalability to managing thousands of FlexEntities instead of hundreds of thousands or millions of sensors and things, intelligent policies and automated workflows that combine one or more FlexEntities with one or more actions.

FIG. 1 illustrates an embodiment of an interoperable IoT system 100 that includes numerous networks of sensors and things 110. The integration of the various IoT networks 120A-120E is achieved through gateways 130A-130E. The gateways 130A-130E can be logical modules or physical hardware implementations and translate the sensor protocols and data into IP based methods for interoperability and broader consumption. It should be recognized that the gateways 130A-130E could be either logical gateways running at the edge of the network or software adapters integrated with cloud service 140.

In one embodiment, cloud service 140, connected through an IP network 150, includes IoT entity manager 160 which offers a systems approach and framework for management and orchestration of the various IoT networks 120A-120E. The system 100 is access agnostic and supports both wireless and wired methods for system integration. Various IoT Applications 170 can access the data from an IoT system database managed by cloud service 140 or directly from the various sensor networks. IP Network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

IoT entity manager 160 uses a systems approach to gather, monitor, and manage, via policies, various data items from the sensors and things 110, thereby breaking application silos and achieving multivendor interoperability, while bridging the older networks and the newer networks with different protocols. The sensors and things 110 can be individual physical sensors, software data objects or virtual entities. A virtual entity may be referred to herein as a FlexEntity, and may include a combination of data streams across the various networks, regardless of the location. In one embodiment, IoT entity manager 160 can be accessed through a web interface using protocols such as HTTP, HTTPS, XML, and RESTful API calls, or through a native mobile application running on a smartphone or tablet, for example. The policies implemented by IoT entity manager 160 can be pre-determined (a priori) or ad hoc based on event conditions in the various sensor networks. Depending on the nature of business and operations, authentication and various levels of security can be enforced before allowing access to the IoT system 100. Based on the roles and responsibilities of users, IoT entity manager 160 can establish and enforce access control privileges. For example, some users can have read-only privileges while administrators can have advanced configuration privileges.

In one embodiment, IoT entity manager 160 allows the functionality of data acquisition, interpretation, analysis, and policy actions to be available to the users of the IoT system 100 from various devices such as desktop consoles, laptops, and mobile user devices. Data captured by the various sensors and things 110 can trigger policy actions as defined by the operating procedures in a particular deployment. Such policies can be applied for regular operations in an enterprise as well as for handling emergency or anomalous situations. Policy actions include, but are not limited to, notifications such as email and SMS, or controls such as tuning a process sub-system, streaming of video to display dashboards, location services, sales process integration, customer support tasks, etc.

In the illustrated IoT system 100, the various sensor networks include both IP and non-IP based communication networks. Communication network 120A focuses on modern wireless protocols such as WiFi, ZigBee, LoRa, BlueTooth, BlueTooth Low Energy, and 6LoWPAN. In a similar vein, communication network 120B integrates traditional protocols such as those used in building management systems and industrial IoT. Examples of such protocols include BACnet, Modbus, SNMP, RS232, RS422, and RS485. Communication network 120C integrates cellular IoT networks via 2G, 3G, 4G, and LTE protocols. Communication network 120D assumes radio networks used for push-to-talk services. Several local area network protocols, such as Ethernet, are integrated via communication network 120E. By extension, a Wide Area Network (WAN) can also be integrated into the overall IoT system 100.

Although FIG. 1 defines a block-level view, in certain embodiments, there could be multiple networks and gateways in the overall IoT system 100 spread across multiple locations. The locations can be within the enterprise, outside the enterprise or in the public Internet depending on the type of data items gathered and the access methods. The IoT system 100 is capable of supporting multiple modalities of data sources including voice, video, data, and sensor readings in a plurality of different formats. It should also be recognized that software applications and simulators could be used to model any of the sensors or networks or gateways defined in the IoT System 100.

Figure 2:
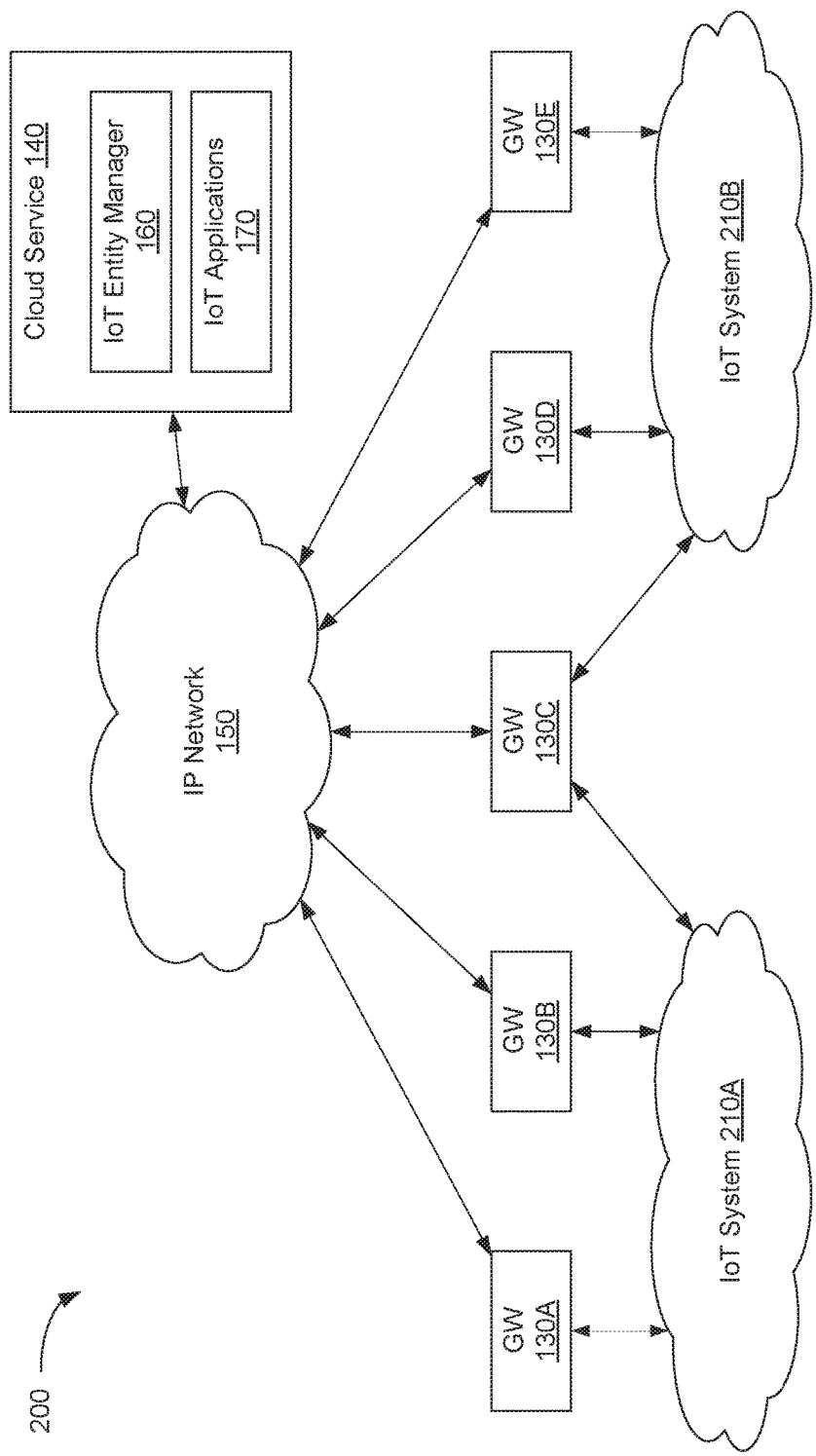
FIG. 2 is a block diagram illustrating a computing environment with hierarchical IoT systems, according to an embodiment.

FIG. 2 is a block diagram illustrating a computing environment with hierarchical IoT systems, according to an embodiment. Extending the concepts from IoT System 100, we can build a hierarchical IoT System 200 as shown in FIG. 2. In the hierarchy, separate IoT systems 210A and 210B serve as inputs to IoT system 200. Such a hierarchy can enable large-scale deployments of IoT networks without compromising interoperability, modularity, and overall management.

Figure 3:
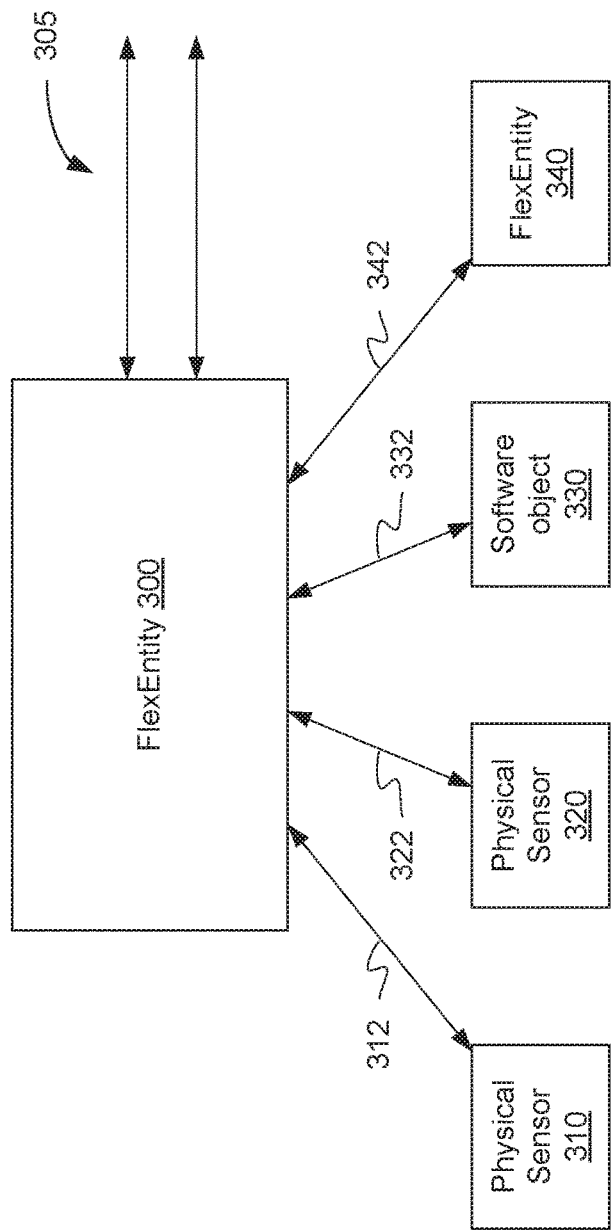
FIG. 3 is a block diagram illustrating a high-level virtual entity (FlexEntity), according to an embodiment.

FIG. 3 is a block diagram illustrating a high-level virtual entity (FlexEntity), according to an embodiment. Any number of sensors and things can be supported by the IoT system 100 or 200. To automate the scalability and interoperability, however, virtual entity 300, also referred to as a FlexEntity, is introduced, as shown in FIG. 3. Enterprise IoT administrators and system architects with administrative privileges can define FlexEntities meaningful to their business without regards to the location of data streams 312-342 associated with FlexEntity 300. These data streams 312-342 can be coming from real sensors or things, from simulators or software internal to the organization, or from external sources as shown in FIG. 3. For example, in one embodiment, data streams 312 and 322 are received from physical sensors 310 and 320, respectively, and may include values indicative of measurements performed by physical sensors 310 and 320. Data stream 332 may be received from a software object 330, either internal to the enterprise or external. Data stream 342 may be received from another FlexEntity 340. This combination builds a powerful hierarchy for use in IoT and other applications. Although four data streams are illustrated as inputs to virtual entity 300, should be noted that there is no limit to the number of internal or external data streams that can be associated with a FlexEntity. It should also be understood that, in certain embodiments, any one of data streams 312-342 can serve as an input to multiple different FlexEntities, including and in addition to FlexEntity 300.

There are numerous benefits of using a FlexEntity. FlexEntity 300 simplifies management and policy by mapping data from numerous data streams 312-342 to be treated as a composite. FlexEntity 300 provides greater IoT scalability as only meaningful data can be sent northbound to management and policy systems. In one embodiment, FlexEntity 300 can be used to map a first number of inputs to a second number of outputs, where the number of outputs can be less than, equal to, or greater than the number of inputs, based on deployment applications. FlexEntity 300 can effect a reduction in database size, improved performance, decreased computation requirements, decreased storage, and better network utilization, especially for wireless networks.

FlexEntity 300 can be repurposed and reused throughout the organization or enterprise based on roles and responsibilities of the various departments. Organizations can build a catalog of FlexEntities for specific use cases and applications. FlexEntity 300 decouples the application layer (e.g., IoT applications 170) from the sensors and things 110 for improved flexibility, reuse, and technology interoperability. In one embodiment, the FlexEntity 300 is inherently technology agnostic.

FlexEntity 300 can be dynamically modified based on new data sources without changing the application layer logic. The hierarchical nature of FlexEntity 300 provides graceful escalation and de-escalation of events, incidents, and other organizational tasks based on real data from multiple networks of sensors, things, and gateways. FlexEntity 300 can be applied to both hardware and software manifestations. This is especially powerful for embedded systems and cloud adapters.

As an example, one embodiment of FlexEntity 300 may be a virtual representation of an actual entity, such as a diesel generator. In this embodiment, FlexEntity 300 might include data streams from physical sensors associated with the diesel generator. These data streams may provide values representing coolant level, coolant temperature, diesel level, output voltage, output frequency, etc. FlexEntity 300 may further include other data streams of external data, such as the price of diesel fuel and the price of crude oil. In such a scenario, IoT entity manager 160 can apply policies to purchase more diesel fuel if the price drops significantly, even though the diesel level is not below a normal refill threshold.

In one embodiment, the number of outputs 305 of FlexEntity 300 is less than the number of input data streams 312-342 so as to decrease or engineer the traffic in the network and scale to large numbers of data items. For example, FlexEntity 300 may represent the status of a large number of subsystems of a particular entity. The FlexEntity 300 may receive data streams from each of those subsystems as input, but generate only a single output representing the overall status (health) of the entity (e.g., good or bad). This single output value can be passed upstream to other systems in order to prevent the need to transmit each of the individual data streams representing the large number of subsystems. This can also improve the use of various networks, both wired and wireless, for supporting IoT systems. In another embodiment, the number of outputs 305 is greater than the number of input data streams 312-342 so as to increase or engineer the traffic in the network to provide additional information for analysis and policy management in IoT systems.

Figure 4:
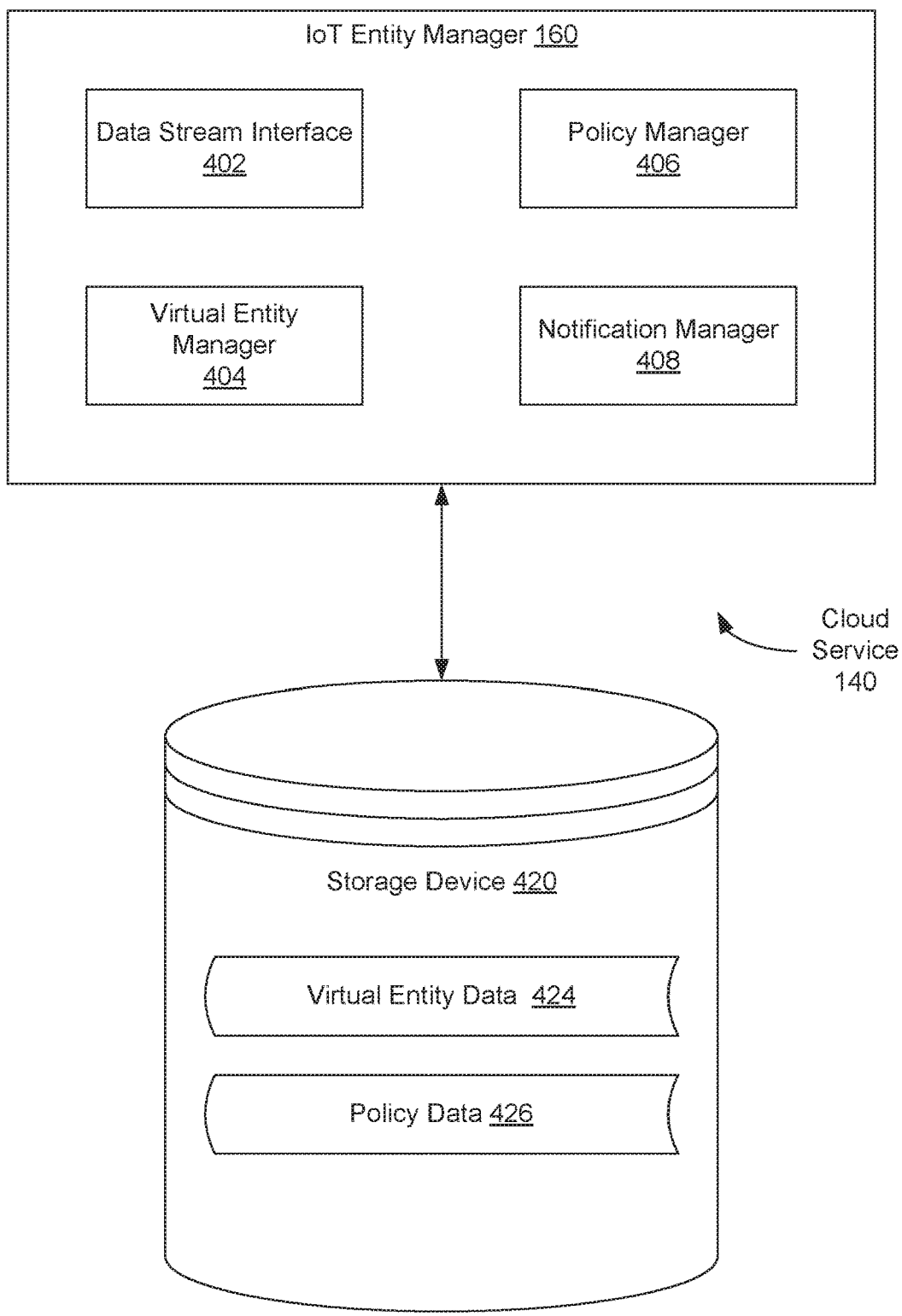
FIG. 4 is a block diagram illustrating an IoT entity manager executed as part of a cloud service, according to an embodiment.

FIG. 4 is a block diagram illustrating an IoT entity manager 160 executed as part of a cloud service 140, according to an embodiment. In one embodiment, IoT entity manager 160 includes data stream interface 402, virtual entity manager 404, policy manager 406, and notification manager 408. This arrangement of modules and components may be a logical separation, and in other embodiments, these modules or other components can be combined together or separated in further components, according to a particular implementation. In one embodiment, storage device 420 is connected to IoT entity manager 160 and includes virtual entity data 424 and policy data 426. In one implementation, cloud service 140 may include both location IoT entity manager 160 and storage device 420. In another embodiment, storage device 420 may be external to cloud service 140, and may be connected to cloud service 140 over a network or other connection. In other implementations, cloud service 140 may include different and/or additional components and applications which are not shown to simplify the description. Storage device 420 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, data stream interface 402 receives one or more input data streams 312-342 from various sources or systems. For example, the sources of the received data streams may be one or more of sensors and things 110. In one embodiment, the received data streams are from sources associated with separate systems. These separate systems may lack interoperability such that they cannot communicate with one another, function together, etc. In one embodiment, the separate systems are created and/or managed by different vendors. In one embodiment, the data streams may be received using different communication protocols of the various IoT networks 120A-120E. In one embodiment, data stream interface 402 has knowledge of the communication protocol being used, or at least can determine the communication protocol being used, to enable parsing of the received data stream. Data stream interface 402 can thus identify the type of data received in the data stream, a value of the data received in the data stream and an entity associated with the data received in the data stream.

In one embodiment, virtual entity manager 404 generates a virtual entity (e.g., FlexEntity 300) to represent physical entity associated with the received data streams. In one embodiment, the physical entity represented by the virtual entity may be a physical entity such as a person, machine or location. Virtual entity manager 404 may store the definition of FlexEntity 300 in virtual entity data 424. This definition may include, for example, an indication of which data streams are associated with the virtual entity, an indication of the entity represented by the virtual entity, etc.

In one embodiment, FlexEntity 300 includes flexible combination of sensors and things 110 from both inside and outside an enterprise (company), which can be dynamically updated. This combination of sensors and things includes a plurality of static or dynamic data items, such as characteristics, time series data, location coordinates, video streams, etc. FlexEntity 300 can include data items from sensors, things, or other FlexEntities. In one embodiment, a FlexEntity includes a data item from a single sensor or thing. Each individual data item that makes up FlexEntity 300 can reside anywhere, either inside the enterprise or external in the Internet, or can be modeled using software. Each data item can communicate information that can be in one of many formats, including but not limited to, number, string, Boolean, HTML, URL, video stream, etc. Data items associated with FlexEntity 300 can be dynamically added or deleted by virtual entity manager 404. For example, virtual entity manager 404 can add or reassign one or more data items based on a company's requirements. Virtual entity manager 404 can further determine a company's needs, determine a required level of priority for any data item included in FlexEntity 300 and compute one or more outputs 305 based on the input data streams 312-342.

In one embodiment, virtual entity manager 404 implements a transformation function that acts on the input data to FlexEntity 300. This transformation function can compute new data items that can potentially be bound as inputs to other FlexEntities. Virtual entity manager 404 can further log the changes to the input data due to application of the transformation function. In one embodiment, virtual entity manager 404 includes a synthesis function that may not run a mathematical transformation function, but may instead apply logic to create new data items that can be used as inputs to the same FlexEntity or to other FlexEntities. In addition, virtual entity manager 404 can group or aggregate a plurality of data streams to create compound entities to simplify management, policy application, and data analysis.

In one embodiment, virtual entity manager 404 manages scalability of data items and can define boundary conditions for the operation of FlexEntity 300. These boundary conditions may include, for example, the minimum and the maximum range of values each of the data streams 312-342 can take in a given network or process. Virtual entity manager 404 can further facilitate exception based threshold management and anomaly detection based on observed data, and can allow conditional visualization based on any violation of configured limits for the input data streams 312-342.

The use of virtual entities by virtual entity manager 404 can establish vendor independence and multivendor interoperability. FlexEntity 300 can mix and match data received from sensors and things of various different vendors, and does not require duplication of management methods and policies. FlexEntity 300 can process data streams, characteristics, and other attributes to support multiple vendors or manufacturers. Virtual entity manager 404 supports replacement of one or more sensors or things without disturbing the running virtual entity in the IoT system 100. Virtual entity manager 404 can adapt to these changes seamlessly because of the flexibility inherent in the definition of the virtual entity (i.e., FlexEntity 300). Virtual entities can be extended to all components in an IoT solution, including but not limited to sensors, things, networks, database objects, applications, etc.

In one embodiment, virtual entity manager 404 maintains local data for local use while only selectively communicating relevant data upstream to cloud and other services. The FlexEntity can determine what is relevant data to be sent upstream, based on a required level of decision-making in the organization. Virtual entity manager 404 can further determine what data or information to pass upstream based on roles and responsibilities of the various participants in the overall management of data within and across organizations. For example, FlexEntity 300 can combine multiple data inputs from the IoT network and only send select data to a partner. This can protect company intellectual property and enhance security. In addition, complex sensor and thing networks can be easily modeled using FlexEntity 300 while retaining the actions to be real. This enables customers to validate the full solution before investing time, money, and resources in buying and deploying IoT solutions. Furthermore, in one embodiment, virtual entity manager 404 can determine the right combination of sensors and things for development, packaging, bundling, or integration in hardware and/or software.

In one embodiment, policy manager 406 applies one or more management policies to the received input data streams associated with a given virtual entity to determine a status of the virtual entity. In one embodiment, policy manager 406 utilizes policies stored in policy data 426. The policies may be default policies programmed into IoT entity manager 160 or may be custom policies created and defined by a customer or user of IoT entity manager 160. The policies may include specific conditions (e.g., thresholds, etc.) associated with different data streams, such that if the condition is satisfied, or the value of a data stream reaches, exceeds, or drops below a corresponding threshold, a particular action or status designation may be triggered. In one embodiment, there may be multiple conditions or thresholds defined for a single data stream. In one embodiment, an action or status designation may be triggered in response to multiple data streams satisfying the conditions or reaching corresponding thresholds.

In one embodiment, notification manager 408 provides a notification of the status of the virtual entity as defined by the applicable policy or policies. Notification manager 408 may present a notification in graphical user interface on a display device or terminal. In other embodiments, notification manager 408 may deliver a short message service (SMS) message, email, voice message, or other form to a customer or user of IoT entity manager 160.

Figure 5:
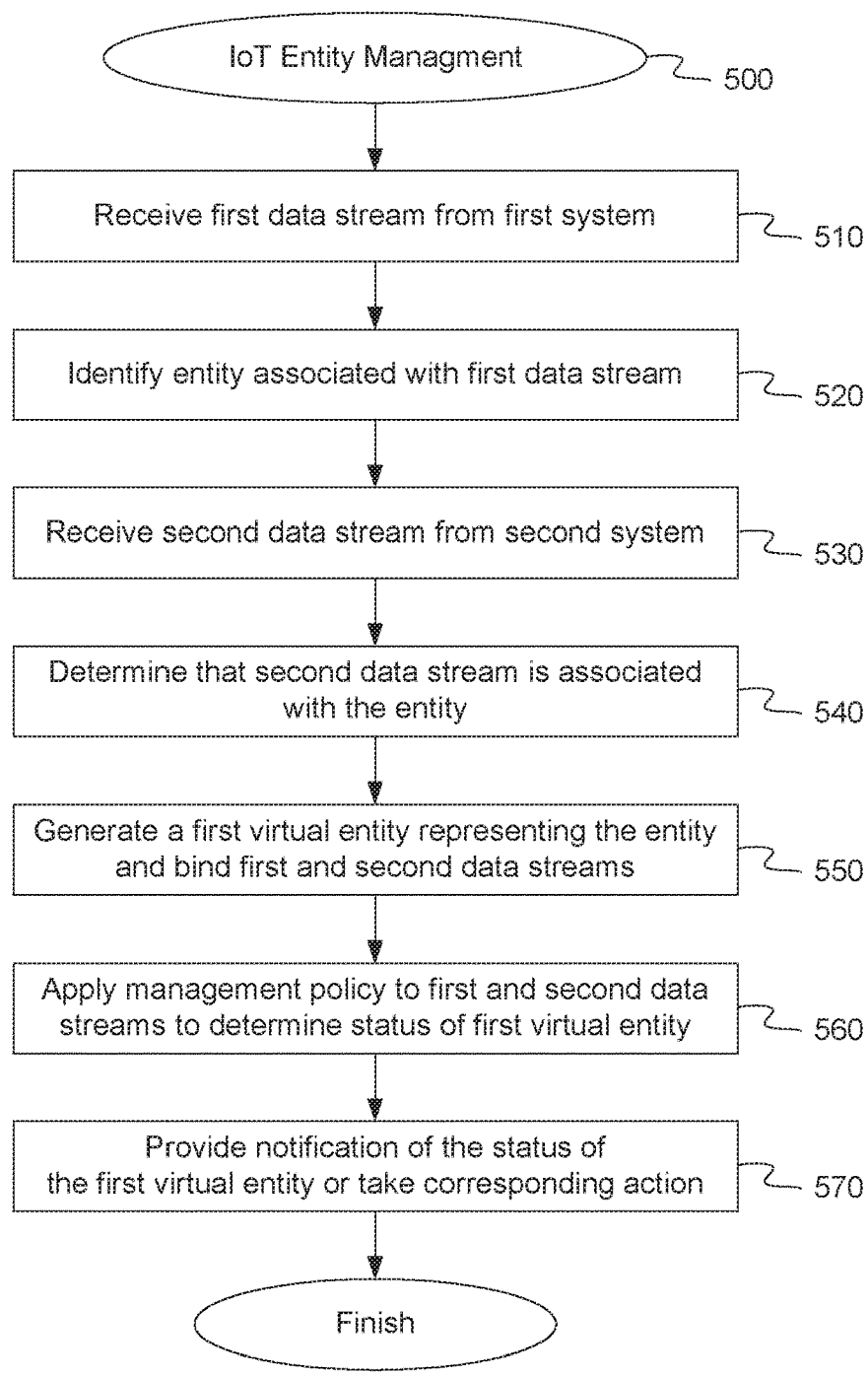
FIG. 5 is a flow diagram illustrating method for creating and managing dynamic IoT virtual entities, according to an embodiment.

FIG. 5 is a flow diagram illustrating method for creating and managing dynamic IoT virtual entities, according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. Although the description that follows describes the creation of a virtual from two data streams, it should be understood that the virtual entity may include any number of data streams or inputs, such as a single data stream or more than two data streams. In one embodiment, method 500 may be performed by IoT entity manager 160 running as part of cloud service 140, as shown in FIGS. 1, 2 and 4.

Referring to FIG. 5, at block 510, method 500 receives a first data stream from a first system. In one embodiment, data stream interface 402 receives the first data stream 312 from a physical sensor 310. The first data stream 312 may be provided over one of IoT networks 120A-120E and processed by one of gateways 130A-130E. For example, the first data stream 312 may include a value representing a level of diesel fuel in a diesel generator. The physical sensor 310 may be part of a first system provided by a first vendor, and may be located on or within the diesel generator.

At block 520, method 500 identifies an entity or entities associated with the first data stream. In one embodiment, the data in first data stream 312 includes an indication of the diesel generator to which is pertains. For example, the data may include a unique identifier or other name assigned to the diesel generator. In one embodiment, data stream interface 402 may read this data, cross-reference it with a list of known entities and associate the data stream with a recognized entity or authorized set of entities. If no recognized entity is found, data stream interface 402 may create a new record for the entity (i.e., the diesel generator).

At block 530, method 500 receives a second data stream from a second system, wherein the second system lacks interoperability with the first system. In one embodiment, data stream interface 402 receives the second data stream 332 from a software object 330. The first data stream 312 may be provided over one of IoT networks 120A-120E and processed by one of gateways 130A-130E. For example, the second data stream 332 may include a value representing a current price of diesel fuel. The software object 330 may be part of a second system provided by a second vendor, such as a system configured to monitor or track the price of diesel fuel or other commodities. In one embodiment, the first system including physical sensor 310 may lack operability with or otherwise be incompatible with the second system. For example, the systems may utilize different communication protocols, such that physical sensor 310 would be unable to access software object 330 to determine the price of diesel fuel.

At block 540, method 500 determines that the second data stream is associated with the entity. In one embodiment, the data in first data stream 332 includes an indication of that it is related to the price of diesel fuel. In one embodiment, data stream interface 402 may read this data, cross-reference it with a list of known entities and associate the data stream 332 with a recognized entity. In another embodiment, a customer or other user of IoT entity manager 160 may manually define the relationship of a data stream with a particular entity.

At block 550, method 500 generates a first virtual entity representing the entity, the first virtual entity comprising the first data stream and the second data stream. In one embodiment, virtual entity manager 404 binds (associates) the first and second data streams to the first virtual entity (FlexEntity 300.) In one embodiment, virtual entity manager 404 generates FlexEntity 300 to represent the diesel generator. Virtual entity manager 404 defines FlexEntity 300 by storing an indication of the first data stream 312 and the second data stream 332 in virtual entity data 424. In one embodiment, FlexEntity 300 includes a flexible combination of sensors and things 110 from both inside and outside the enterprise. FlexEntity 300 can include a plurality of static or dynamic data items, such as characteristics, time series data, location coordinates, video streams, etc. In the example used herein, FlexEntity 300 comprises a logical association of data stream 312 representing the level of diesel fuel in the generator and data stream 332 representing the price of diesel fuel. Without the FlexEntity, there would be no way to associate the data from the two separate data streams, much less to make business decisions based on data from both data streams. In one embodiment, FlexEntity 300 representing the diesel generator may have previously existed. In such an embodiment, virtual entity manager 404 may modify the existing FlexEntity 300 to associate first data stream 312 and second data stream 332 with the FlexEntity 300, as described above, rather than creating an entirely new virtual entity from scratch.

At block 560, method 500 applies a management policy to the first data stream and the second data stream to determine a status of the first virtual entity. In one embodiment, policy manager 406 applies one or more management policies to the received input data streams associated with a given virtual entity to determine the status. In one embodiment, policy manager 406 utilizes policies stored in policy data 426. The policies may include specific conditions thresholds associated with different data streams, such that if the value of a data stream reaches, exceeds, or drops below a corresponding threshold, a particular action or status designation may be triggered. For example, one policy may indicate that if the level of diesel fuel in the generator is below a certain level, as indicated by data stream 312, and the price of diesel fuel is below a certain price, as indicated by data stream 332, then a refill status may be triggered.

At block 570, method 500 provides a notification of the status of the first virtual entity as defined by the policy. In one embodiment, notification manager 408 provides a notification of the status of the virtual entity as defined by the applicable policy or policies. Notification manager 408 may present a notification in graphical user interface on a display device or terminal. In other embodiments, notification manager 408 may deliver a short message service (SMS) message, email, voice message, or other form to a customer or user of IoT entity manager 160. For example, notification manager 408 may notify the user of the refill status, so that the user can order additional diesel fuel for the generator.

Figure 6:
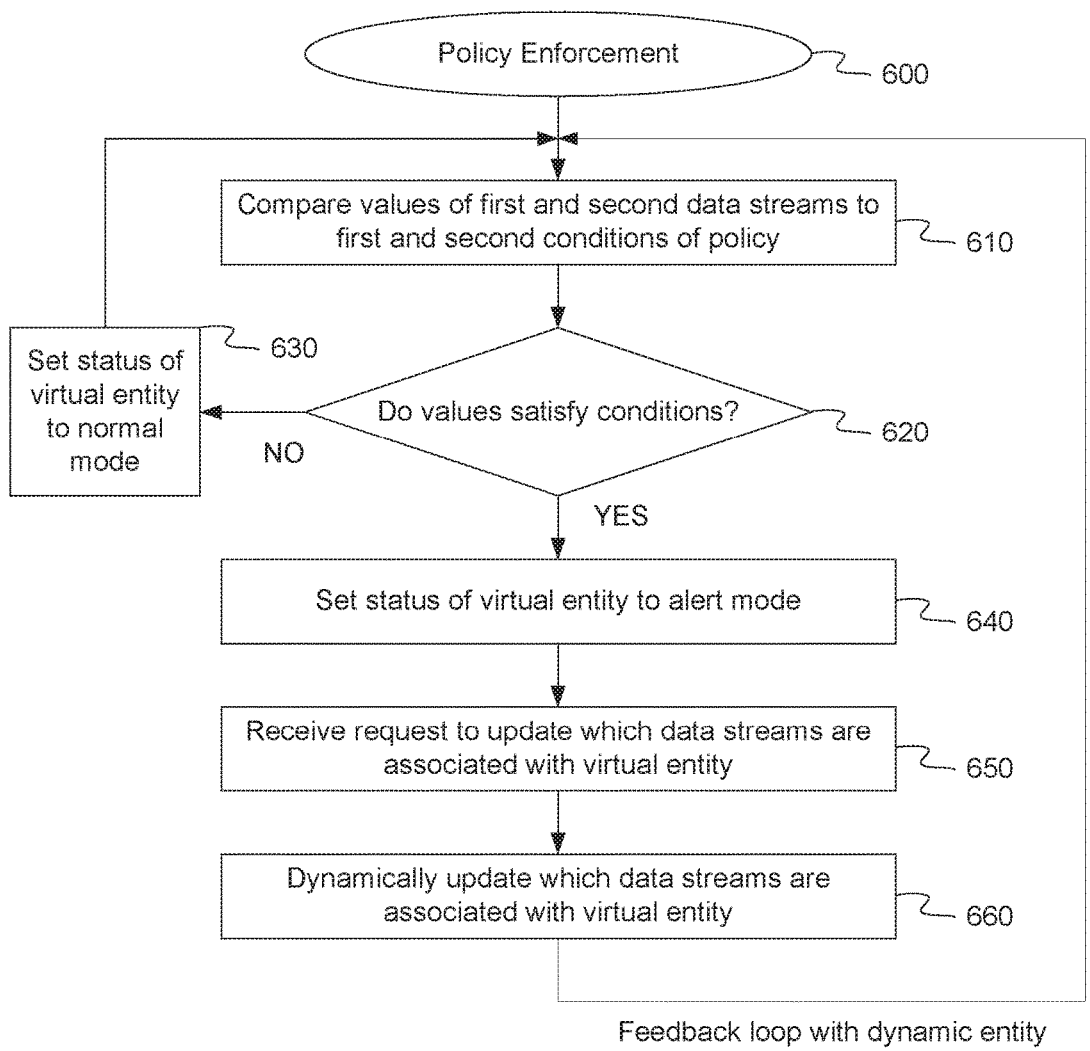
FIG. 6 is a flow diagram illustrating method for policy enforcement using dynamic IoT virtual entities, according to an embodiment.

FIG. 6 is a flow diagram illustrating method for policy enforcement using dynamic IoT virtual entities, according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 600 may be performed by IoT entity manager 160 running as part of cloud service 140, as shown in FIGS. 1, 2 and 4.

Referring to FIG. 6, at block 610, method 600 compares a value of the first data stream to a first condition defined by a management policy and compares a value of the second data stream to a second condition defined by the management policy. As described above, for example, policy manager 406 may compare the level of diesel fuel in the generator, as indicated by data stream 312, to a first threshold level, and compare the price of diesel fuel, as indicated by data stream 332, to a second threshold price.

At block 620, method 600 determines whether the value of the first data stream satisfies the first condition and whether the value of the second data stream satisfies the second condition. In one embodiment, policy manager 406 determines whether the level of diesel fuel in the generator is below the first threshold and/or the price of diesel fuel is below the second threshold.

If one or both of the values do not satisfy the conditions (e.g., do not meet the respective thresholds), at block 630, method 600 sets a status of the virtual entity to a normal mode. In the normal mode, no refill of the diesel fuel may be ordered and refills may occur according to a defined periodic schedule, for example. If one or both of the values do satisfy the conditions (e.g., meet the respective thresholds), however, at block 640, method 600 sets a status of the virtual entity to alert mode. The alert mode may indicate that additional diesel fuel should be ordered. The example of the diesel generator is merely meant to explain the operation and functionality of a FlexEntity. It should be understood, that the FlexEntity concept could be applied to any number of different situations, all of which cannot be described herein. In another embodiment, rather than setting the status of the virtual entity to the normal mode or to the alert mode, method 600 may take some other actions, such as any actions defined by the management policy.

At block 640, method 600 receives a request to update which data streams are associated with the first virtual entity. Virtual entity manager 404 may receive a request from the user to modify the data streams specified in virtual entity data 424. The request may include instructions to remove one or more data streams, add one or more new data streams, or replace one or more data streams. At block 660, method 600 dynamically updates which data streams are associated with the first virtual entity. For example, virtual entity manager 404 may add a new data stream 322 to FlexEntity 300. In one embodiment, data stream 322 may correspond to a physical sensor 320. For example, the data stream 320 may include a value representing a level of efficiency at which the diesel generator is operating. The physical sensor 320 may be part of a third system provided by a third vendor, and may be located on or within the diesel generator. This data stream 322 can be added to FlexEntity 300 without interrupting operation of the system. In another embodiment, rather than updating the existing FlexEntity 300, virtual entity manager 404 may create a new virtual entity that includes the data streams 312 and 332 (which were present in FlexEntity 300), as well as the new data stream 322.

Figure 7:
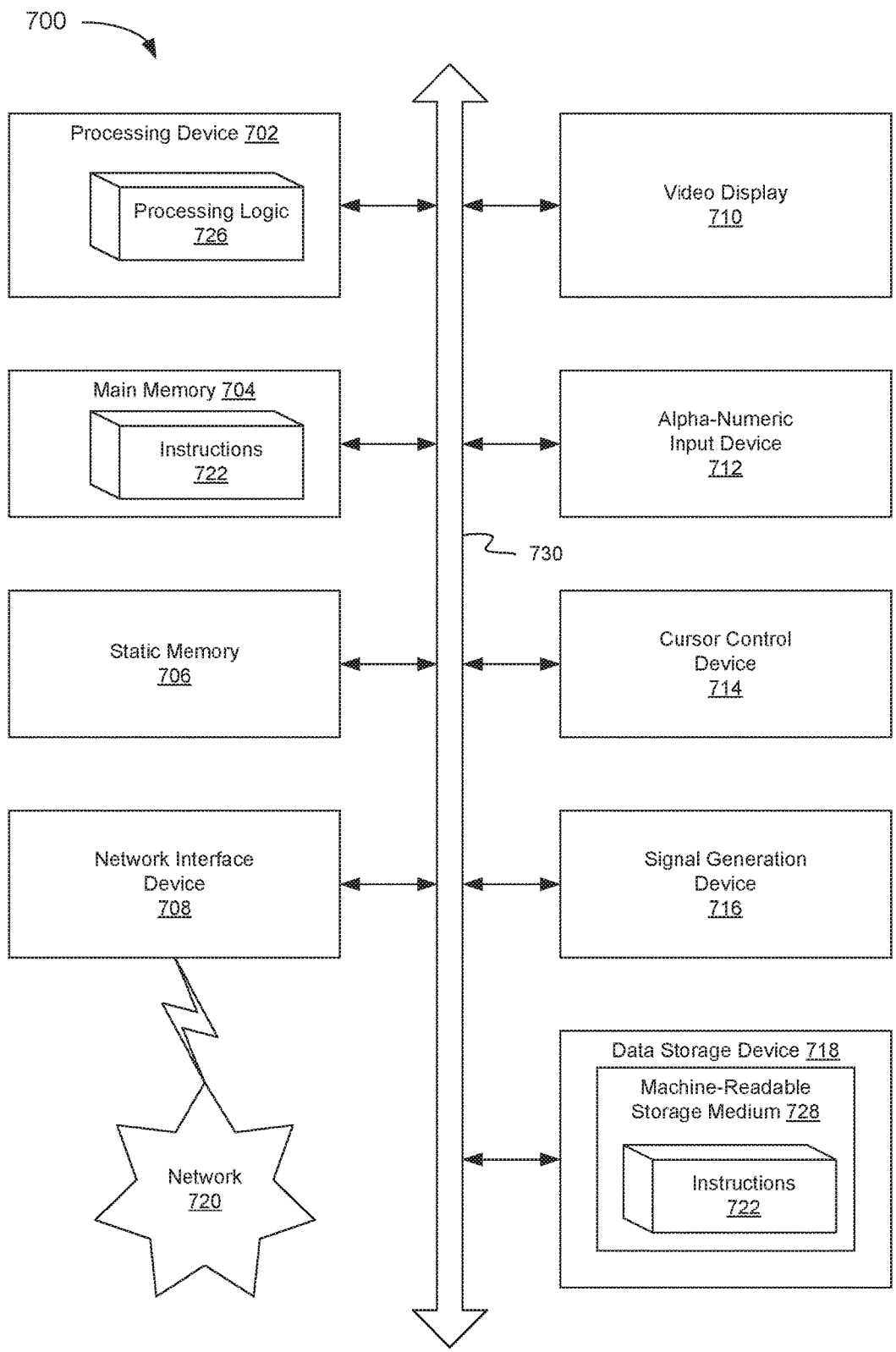
FIG. 7 is a block diagram illustrating a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a computing device, such as one executing cloud service 140, as illustrated in FIGS. 1, 2 and 4.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions for creating and managing dynamic IoT entities, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a first data stream from a first system;
   identifying an entity associated with the first data stream;
   receiving a second data stream from a second system, wherein the second system lacks interoperability with the first system;
   determining that the second data stream is associated with the entity;
   generating, by a processing device, a first virtual entity representing the entity, the first virtual entity comprising the first data stream and the second data stream;
   applying a management policy to the first data stream and the second data stream to determine a status of the first virtual entity; and
   providing a notification of the status of the first virtual entity as defined by the policy.

2. The method of claim 1, wherein the first data stream comprises data from a first physical sensor and wherein the second data stream comprises data from a second physical sensor.

3. The method of claim 1, wherein the first data stream comprises data from a first physical sensor and wherein the second data stream comprises data from a software object.

4. The method of claim 1, wherein at least one of the first data stream or the second data stream comprises data from a second virtual entity.

5. The method of claim 1, wherein the first virtual entity comprises a logical association of a plurality of data streams associated with the entity.

6. The method of claim 5, further comprising:
   dynamically updating which of the plurality of data streams are associated with the first virtual entity.

7. The method of claim 1, wherein applying the management policy comprises determining whether a value of the first data stream satisfies a first condition of the management policy and whether a value of the second data stream satisfies a second condition of the management policy.

8. An apparatus comprising:
   a memory; and
   a processing device operatively coupled to the memory, the processing device to:
   receive a first data stream from a first system;
   identify an entity associated with the first data stream;
   receive a second data stream from a second system, wherein the second system lacks interoperability with the first system;
   determine that the second data stream is associated with the entity;
   generate a first virtual entity representing the entity, the first virtual entity comprising the first data stream and the second data stream;
   apply a management policy to the first data stream and the second data stream to determine a status of the first virtual entity; and
   provide a notification of the status of the first virtual entity as defined by the policy.

9. The apparatus of claim 8, wherein the first data stream comprises data from a first physical sensor and wherein the second data stream comprises data from a second physical sensor.

10. The apparatus of claim 8, wherein the first data stream comprises data from a first physical sensor and wherein the second data stream comprises data from a software object.

11. The apparatus of claim 8, wherein at least one of the first data stream or the second data stream comprises data from a second virtual entity.

12. The apparatus of claim 8, wherein the first virtual entity comprises a logical association of a plurality of data streams associated with the entity.

13. The apparatus of claim 12, wherein the processing device further to:
   dynamically update which of the plurality of data streams are associated with the first virtual entity.

14. The apparatus of claim 8, wherein to apply the management policy, the processing device to determine whether a value of the first data stream satisfies a first condition of the management policy and whether a value of the second data stream satisfies a second condition of the management policy.

15. A non-transitory machine-readable storage medium storing instructions which, when executed, cause a processing device to perform operations comprising:
   receiving a first data stream from a first system;
   identifying an entity associated with the first data stream;
   receiving a second data stream from a second system, wherein the second system lacks interoperability with the first system;
   determining that the second data stream is associated with the entity;
   generating, by the processing device, a first virtual entity representing the entity, the first virtual entity comprising the first data stream and the second data stream;
   applying a management policy to the first data stream and the second data stream to determine a status of the first virtual entity; and
   providing a notification of the status of the first virtual entity as defined by the policy.

16. The non-transitory machine-readable storage medium of claim 15, wherein the first data stream comprises data from a first physical sensor and wherein the second data stream comprises data from a second physical sensor.

17. The non-transitory machine-readable storage medium of claim 15, wherein the first data stream comprises data from a first physical sensor and wherein the second data stream comprises data from a software object.

18. The non-transitory machine-readable storage medium of claim 15, wherein the first virtual entity comprises a logical association of a plurality of data streams associated with the entity.

19. The non-transitory machine-readable storage medium of claim 18, further comprising:
   dynamically updating which of the plurality of data streams are associated with the first virtual entity.

20. The non-transitory machine-readable storage medium of claim 15, wherein applying the management policy comprises determining whether a value of the first data stream satisfies a first condition of the management policy and whether a value of the second data stream satisfies a second condition of the management policy.

\* \* \* \* \*